E. EGLI.
EMBROIDERY CUTTING MACHINE.
APPLICATION FILED OCT. 6, 1909.
989,770.
Patented Apr. 18, 1911.
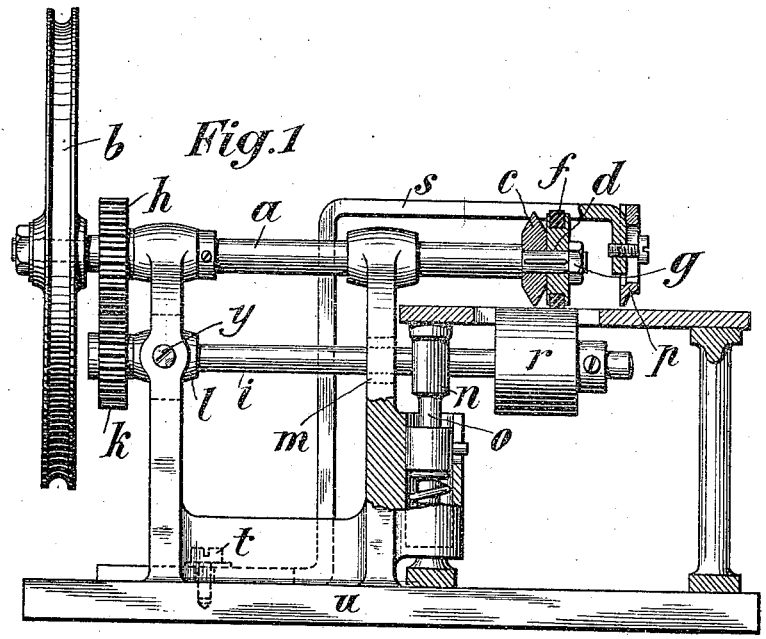
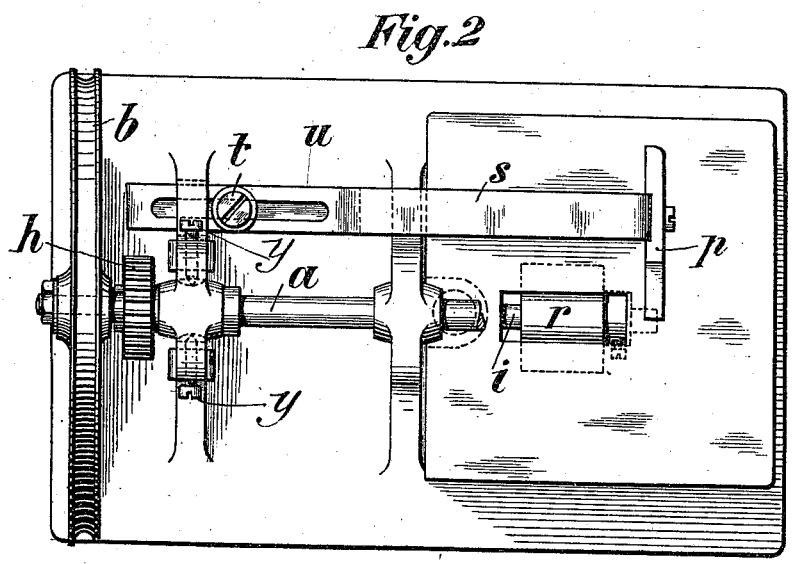
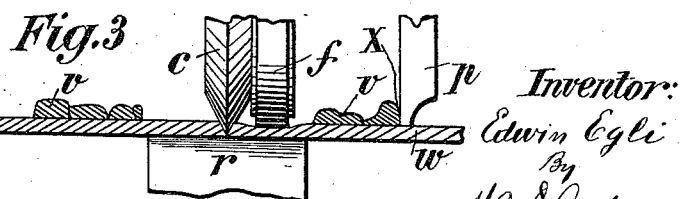
Witnesses:
Inventor:
Edwin Egli ptic
UNITED STATES PATENT OFFICE.

EDWIN EGLI, OF ST. GALLEN, SWITZERLAND, ASSIGNOR TO CONRAD KOLLER-ALDER, OF ST. GALLEN, SWITZERLAND.

EMBROIDERY-CUTTING MACHINE.

989,770. Specification of Letters Patent. Patented Apr. 18, 1911.

Application filed October 6, 1909. Serial No. 521,389.

*To all whom it may concern:*

Be it known that I, EDWIN EGLI, a citizen of the Republic of Switzerland, residing at Goliathgasse, St. Gallen, Switzerland, have invented certain new and useful Improvements in Embroidery - Cutting Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The subject of my invention is a machine for severing embroidered strips, such for instance as entredeux, worked on one and the same ground.

The new machine is provided with a rotary cutter, a rubber faced fabric feeder, and a stop for one edge of the embroidery, which projects above the ground, and the distance between the cutter and the stop is adjustable.

One embodiment of the invention is shown in the accompanying drawing, in which—

Figure 1 is a front elevation and part section of the machine, while Fig. 2. is a plan of the same. Fig. 3 is a sectional fragmental view, drawn to a larger scale, illustrating the operation of cutting.

On the shaft $a$, which may be driven by a grooved pulley $b$, there is mounted fast a rotary cutting disk $c$, and a rubber faced fabric feeder, consisting of a wheel $d$ peripherally grooved to receive a rubber ring $f$. The cutter $c$ and feeder $d$ sit closely together and are pressed firmly against a shoulder on the shaft $a$ by means of a nut $g$. They may, as regards their positions, be interchanged. On the shaft $a$ there is also mounted a gear wheel $h$, which meshes with a gear wheel $k$, mounted on a shaft $i$. This latter shaft $i$ is mounted at one end in a bearing $l$ between two centers $y$ $y$, and receives lateral guidance from a second elongated bearing $m$. $n$ is a third bearing carried by a rod $o$, which is vertically mounted and is controlled by a spring. On the shaft $i$ there is further mounted a laterally adjustable hardened steel roller $r$ against which the cutter $c$ bears.

$p$ is a vertically adjustable stop secured to a bent arm $s$, which can be adjusted horizontally by means of a screw $t$ engaging in a slot and holding it to the framing $u$.

The operation of the machine is as follows:—As is well known, in embroidering strips and entredeux a number of parallel rows of embroidery $v$ (Fig. 3) are produced on a single web or ground $w$. This embroidered web must, subsequently, be severed between each two adjacent rows $v$. For this purpose I lay the ground-web in the machine in such manner that one edge $x$ of the one row of embroidery $v$ lies against the stop $p$. On revolution of the shaft $a$ the feeder $d$ then advances the web and the latter is severed at the place where the cutter $c$ contacts with the roller $r$, which is borne against it by spring pressure. By adjustment of the arm $s$ and by changing the positions of the cutter and the feeder the space between the stop $p$ and the cutter $c$, and thus the distance between the line of cut and the edge $x$ can be varied. Should the roller $r$ become worn at the line of cut, it can be shifted somewhat in lateral direction.

Having now particularly described and ascertained the nature of the said invention and in what manner the same is to be performed, I declare that what I claim is:—

1. In an embroidery cutting machine having a rotary cutter and a roller serving as a counter-die to the said cutter, a stop adapted to serve as guide for an edge of the embroidery projecting from the surface of the fabric to be cut.

2. In an embroidery cutting machine having a rotary cutter and a roller serving as a counter-die to the said cutter, a stop adapted to serve as guide for an edge of the embroidery projecting from the surface of the fabric to be cut, said stop being laterally adjustable.

3. In an embroidery cutting machine, a rotary cutter, a roller serving as a counter die to said cutter and a stop adapted to serve as a guide for an edge of the embroidery projecting from the surface of the fabric to be cut, said rotary cutter having a roller of elastic material engaging the surface of the counter die.

In testimony that I claim the foregoing as my invention, I have signed my name in presence of two subscribing witnesses.

EDWIN EGLI.

Witnesses:
RANDALL ATKINSON,
ALBERT PHILLIPS.

Copies of this patent may be obtained for five cents each, by addressing the "Commissioner of Patents, Washington, D. C."